(12) United States Patent
Stoessel

(10) Patent No.: US 11,682,942 B2
(45) Date of Patent: Jun. 20, 2023

(54) DRIVE ASSEMBLY

(71) Applicant: FTE AUTOMOTIVE GmbH, Ebern (DE)

(72) Inventor: Roland Stoessel, Ebern (DE)

(73) Assignee: FTE AUTOMOTIVE GmbH, Ebern (DE)

( * ) Notice: Subject to any disclaimer, the term of this patent is extended or adjusted under 35 U.S.C. 154(b) by 108 days.

(21) Appl. No.: 17/324,722

(22) Filed: May 19, 2021

(65) Prior Publication Data

US 2021/0367475 A1 Nov. 25, 2021
US 2022/0263373 A9 Aug. 18, 2022

(30) Foreign Application Priority Data

May 19, 2020 (DE) ...................... 10 2020 113 551.3

(51) Int. Cl.
*H02K 3/52* (2006.01)
*H02K 11/33* (2016.01)
(Continued)

(52) U.S. Cl.
CPC ............. *H02K 3/522* (2013.01); *H02K 3/325* (2013.01); *H02K 5/225* (2013.01); *H02K 11/33* (2016.01); *H02K 2211/03* (2013.01)

(58) Field of Classification Search
CPC .......... H02K 3/325; H02K 3/522; H02K 5/04; H02K 5/225; H02K 11/33; H02K 2211/03;
(Continued)

(56) References Cited

U.S. PATENT DOCUMENTS

2009/0224626 A1* 9/2009 Eppler ...................... H02K 1/16
310/413
2012/0080626 A1* 4/2012 Fuerst ................... B60T 8/3675
251/129.15
(Continued)

FOREIGN PATENT DOCUMENTS

CH             699 082 A1    1/2010
DE     10 2016 206 404 A1   10/2017
(Continued)

OTHER PUBLICATIONS

Hirata et al, Pump and Pump Drive Device, May 5, 2011, WO 2011052741 (English Machine Translation) (Year: 2011).*
(Continued)

*Primary Examiner* — Alexander A Singh

(74) *Attorney, Agent, or Firm* — Oblon, McClelland, Maier & Neustadt, L.L.P.

(57) ABSTRACT

A drive assembly having an electric motor, having a stator housing, a stator accommodated therein and having at least one winding, a stator insulation which has a lower part and an upper part, wherein the lower part rests against at least one bearing surface in the stator housing, terminal contacts for the winding, wherein the terminal contacts are held in a contact carrier, which is provided on the lower part of the stator insulation, and a printed circuit board, which rests on at least one supporting surface in the stator housing, wherein (Continued)

the terminal contacts are in contact with associated conductor tracks of the printed circuit board.

10 Claims, 5 Drawing Sheets

(51) Int. Cl.
  *H02K 3/32* (2006.01)
  *H02K 5/22* (2006.01)
(58) Field of Classification Search
  CPC ........... H02K 2203/03; H02K 2203/06; H02K 2203/12; H02K 5/22; H02K 3/50; H02K 3/52; H02K 3/345; H02K 1/185
  USPC .......................................... 310/71, 214, 215
  See application file for complete search history.

(56) References Cited

U.S. PATENT DOCUMENTS

| 2016/0099623 | A1* | 4/2016 | Böhm ...................... | H02K 9/19 |
| | | | | 310/43 |
| 2016/0261161 | A1* | 9/2016 | Roos ....................... | H02K 3/522 |
| 2016/0377082 | A1 | 12/2016 | Fecke et al. | |
| 2018/0241273 | A1* | 8/2018 | Beetz ...................... | H02K 3/522 |

FOREIGN PATENT DOCUMENTS

| DE | 102016206404 A1 * | 10/2017 | ............. F04D 13/06 |
| WO | WO 2011/052741 A1 | 5/2011 | |
| WO | WO-2011052741 A1 * | 5/2011 | ........... F04D 29/628 |

OTHER PUBLICATIONS

Schupfner et al, Electric Motor in particular Pump Motor, Oct. 19, 2017, DE 102016206404 (English Machine Translation) (Year: 2017).*

German Search Report dated Feb. 9, 2021 in German Application 10 2020 113 551.3 filed on May 19, 2020, citing documents AO-AQ therein, 7 pages (with English Translation of Categories of Cited Documents & Written Opinion).

German Search Report dated Feb. 9, 2021 in German Application 10 2020 133 551.3 filed on May 19, 2020, citing documents AO-AQ therein, 7 pages (with English Translation of Categories of Cited Documents & Written Opinion).

Extended European Search Report dated Sep. 23, 2021 in European Patent Application No. 21174189.7, citing documents AA therein, 8 pages.

* cited by examiner

DRIVE ASSEMBLY

The invention relates to a drive assembly having an electric motor, which can be used in particular to provide a hydraulic oil flow that can be used for a transmission actuator or for cooling and/or lubricating a transmission of an automotive vehicle.

The electric motor of the drive assembly can have a stator housing, in which the stator of the electric motor and a printed circuit board are arranged, which is used for contacting the stator windings. The stator windings themselves are wound onto a stator insulation, within which the stator laminations are situated.

The stator insulation can be an injection moulding, which is welded onto the assembly of stator laminations. However, in the present case, the stator insulation consists of an upper part and a lower part, which are assembled in such a way that the laminated stator core is accommodated between them.

The problem with this mode of construction is that the laminated stator core has a very large tolerance overall, and therefore the overall height of the subassembly consisting of the upper part and the lower part of the stator insulation and the laminated stator core accommodated between them varies considerably. A great effort is therefore required to make electric contact with the stator windings, especially if this is supposed to be accomplished by press-in contacts that have to be pressed into the openings of the printed circuit board. The permitted positional tolerance of the press-in pins is namely significantly smaller than the height tolerance resulting from the tolerances of the laminated stator core.

It is the object of the invention to provide a drive assembly in which the coil windings can be electrically contacted with little effort.

To achieve this object, the invention provides a drive assembly having an electric motor, having a stator housing, a stator accommodated therein and having at least one winding, a stator insulation which has a lower part and an upper part, wherein the lower part rests against at least one bearing surface in the stator housing, terminal contacts for the winding, wherein the terminal contacts are held in a contact carrier, which is provided on the lower part of the stator insulation, and a printed circuit board, which rests on at least one supporting surface in the stator housing, wherein the terminal contacts are in contact with associated conductor tracks of the printed circuit board. The invention is based on the basic concept of defining the position of the terminal contacts and of the printed circuit board within the stator housing relative to one and the same component, namely the stator housing. Since it is possible, in particular, for this to be embodied as an injection moulding, the bearing surface and the supporting surface are always arranged in an identical manner relative to one another, and therefore the terminal contacts are also arranged in an identical manner relative to the printed circuit board. In particular, this avoids the formation of tolerance chains.

According to one embodiment, it is envisaged that the upper part and the lower part of the stator insulation are connected to one another by means of a latching connection. This makes it possible to mount the upper part and the lower part with little effort on the laminated stator core.

The latching connection preferably allows play of the upper part relative to the lower part, thus enabling tolerances of the laminated stator core to be compensated or absorbed.

The stator housing preferably has a base which forms the bearing surface for the lower part. As a result, the stator insulation is supported over a large area within the stator housing.

According to a preferred embodiment of the invention, the stator housing has a shoulder on which the supporting surface for the printed circuit board is arranged. The printed circuit board can project laterally beyond the stator insulation, thus enabling it to be placed on the shoulder of the housing during assembly.

According to one embodiment of the invention, a plurality of supporting surfaces is arranged on the shoulder, wherein a centring pin is assigned to at least one of the supporting surfaces. By means of the centring pin, the printed circuit board can also be positioned precisely in the lateral direction, thus ensuring that the terminal contacts are positioned precisely relative to the printed circuit board not only in respect of height but also in respect of the lateral position.

The upper part of the stator insulation can rest laterally against the contact carrier, and therefore the upper part is guided precisely relative to the lower part.

The terminal contacts can be embodied as insulation displacement contacts, wherein the contact carrier has guide channels for the ends of the winding. The ends of the windings can then be arranged in the guide channels of the stator insulation, ensuring that the ends of the windings are contacted automatically during the installation of the terminal contacts.

Each terminal contact can have a press-in pin which is pressed into a contact opening of the printed circuit board. By this means, the terminal contacts can be connected electrically to the conductor tracks of the printed circuit board in a low-cost manner.

In a preferred embodiment, the drive assembly is used to supply a transmission actuator, wherein the electric motor drives an oil pump that can provide a hydraulic oil flow which can be used for a transmission actuator or for cooling and/or lubricating a transmission of an automotive vehicle.

The invention will be described below on the basis of an embodiment which is illustrated in the appended drawings. In these drawings.

Figure 1:
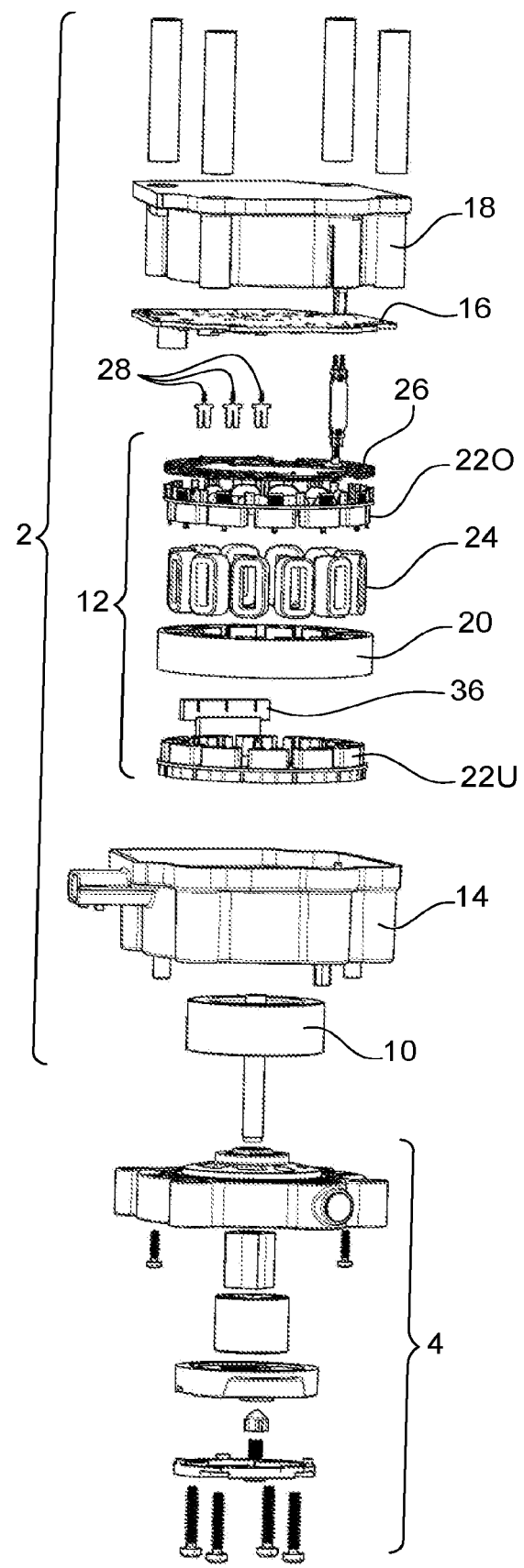
FIG. 1 shows a drive assembly according to the invention in an exploded view.
Figure 2:
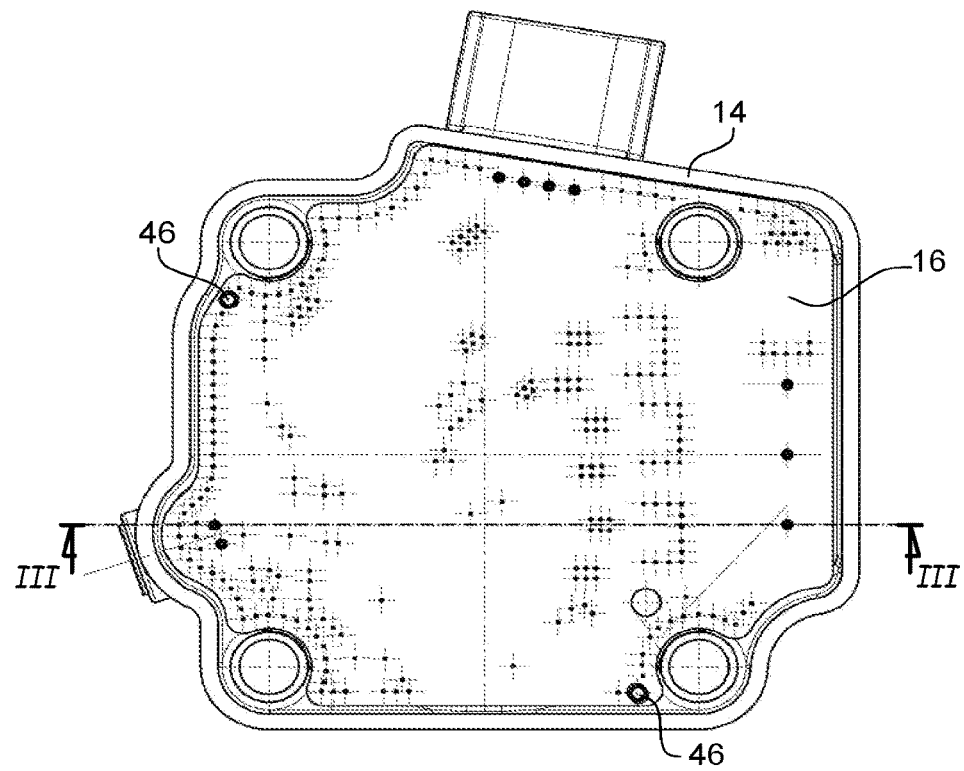
FIG. 2 shows a plan view of the drive assembly with the housing cover open, wherein the printed circuit board can be seen.

In a perspective view, FIG. 1 shows a drive assembly which has an electric motor 2 and an oil pump 4. The oil pump is used to provide a hydraulic oil flow with which it is possible, in particular, to supply a transmission actuator of an automotive vehicle. The electric motor 2 is used to drive the pump 4.

The electric motor 2 has a rotor 10, which is arranged spatially within a stator 12. The stator 12 is arranged in a stator housing 14, which also accommodates a printed circuit board 16. A housing cover 18 is furthermore provided.

The stator housing 14 has a dome-shaped structure 19, such that, although the rotor 10 is arranged in the interior of the stator 12, it is nevertheless outside the stator housing 14.

The stator housing 14 is preferably an injection moulding made of plastic.

The stator 12 has a core 20 consisting of stator laminations, which is assigned a stator insulation 22 formed from a lower part 22U and an upper part 22O. A winding 24 is furthermore provided for each stator pole.

Here, the windings 24 are shown in a purely schematic way. The reference sign 26 indicates the ends of the windings, which are provided for the purpose of electrically contacting the windings 24.

Three terminal contacts 28, which are each embodied as insulation displacement contacts with a press-in pin, are provided for electrical contacting. The press-in pins of the terminal contacts 28 are pressed into suitable press-in openings of the printed circuit board 16 in order to achieve electrical connection to conductor tracks of the printed circuit board 16, thus enabling the windings 24 to be controlled in a manner known per se.

The lower part 22U and the upper part 22O of the stator insulation are composed of plastic and are secured on one another in such a way that the laminated stator core 20 is accommodated between them. In order to secure the two parts on one another, a latching connection 30 is provided (see especially FIG. 3), which consists of latching tabs 32, 34 that engage in one another.

Figure 7:
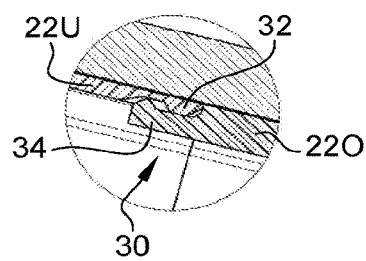
FIG. 7 shows the detail VII in FIG. 6 on an enlarged scale.
Figure 8:
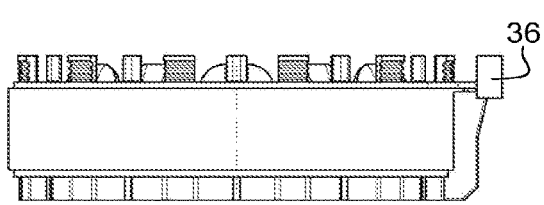
FIG. 8 shows a side view of the stator in FIG. 4.
Figure 9:
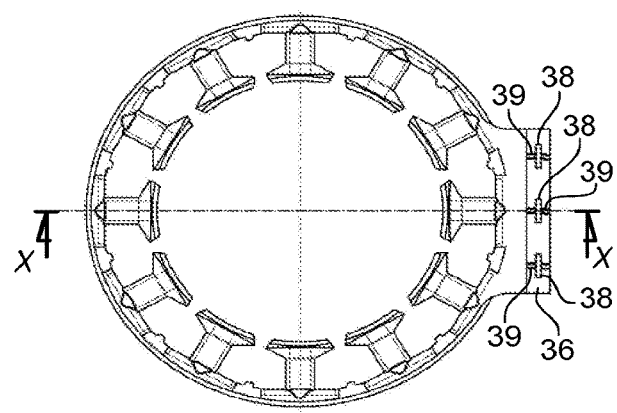
FIG. 9 shows a plan view of the stator.
Figure 10:
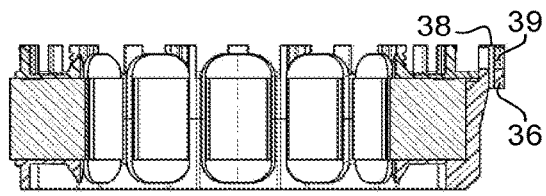
FIG. 10 shows a section along the plane X-X in FIG. 9.

In FIG. 7, it is possible to see a free space on the mutually facing sides of the latching tabs 32, 34, said space allowing play of the two parts 22U, 22O relative to one another. By means of this play, it is possible to absorb tolerances in the height of the laminated stator core 20.

Figure 5:
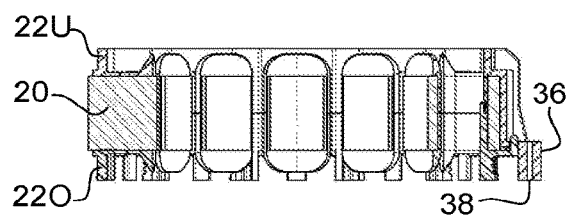
FIG. 5 shows a section along the plane V-V in FIG. 4.
Figure 6:
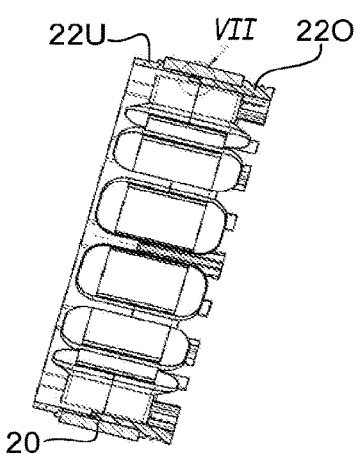
FIG. 6 shows a section along the plane VI-VI in FIG. 4.

In the assembled state, the upper part 22O rests against the inside of the contact carrier 36 and is guided there (see especially FIG. 5).

The stator insulation 22 is composed, in particular, of plastic, which is preferably produced in an injection moulding process.

The terminal contacts 28 are mounted on the stator insulation 22, namely on the lower part 22U. For this purpose, a contact carrier 36 is embodied integrally with the lower part 22U (see especially FIGS. 4, 5, 9 and 10).

For each terminal contact to be received, the contact carrier 36 has a receiving slot 38, which extends transversely to a guide channel 39 for one end of a stator winding.

Figure 11:
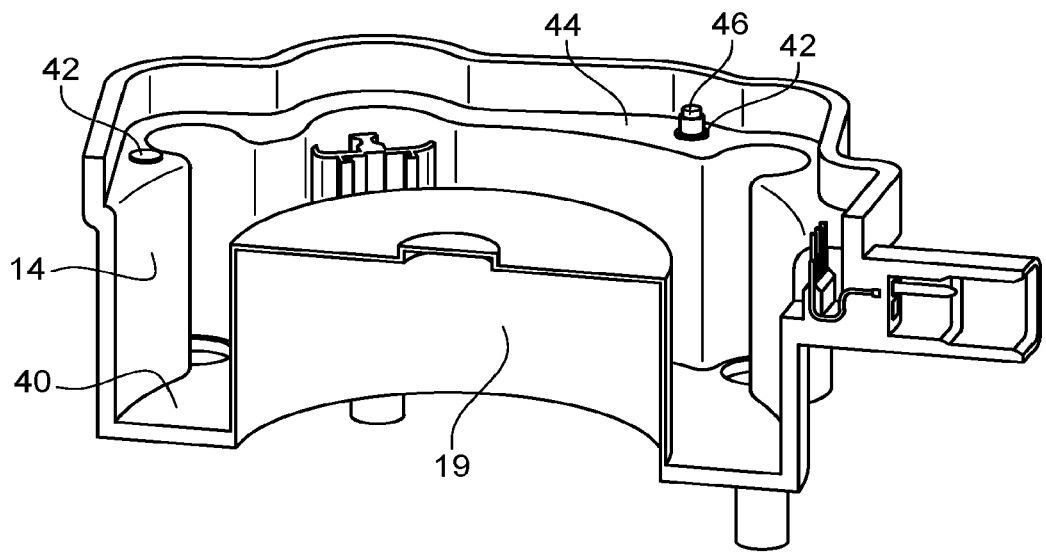
FIG. 11 shows the stator housing of the drive assembly of FIG. 1 in a perspective sectioned view.
Figure 12:
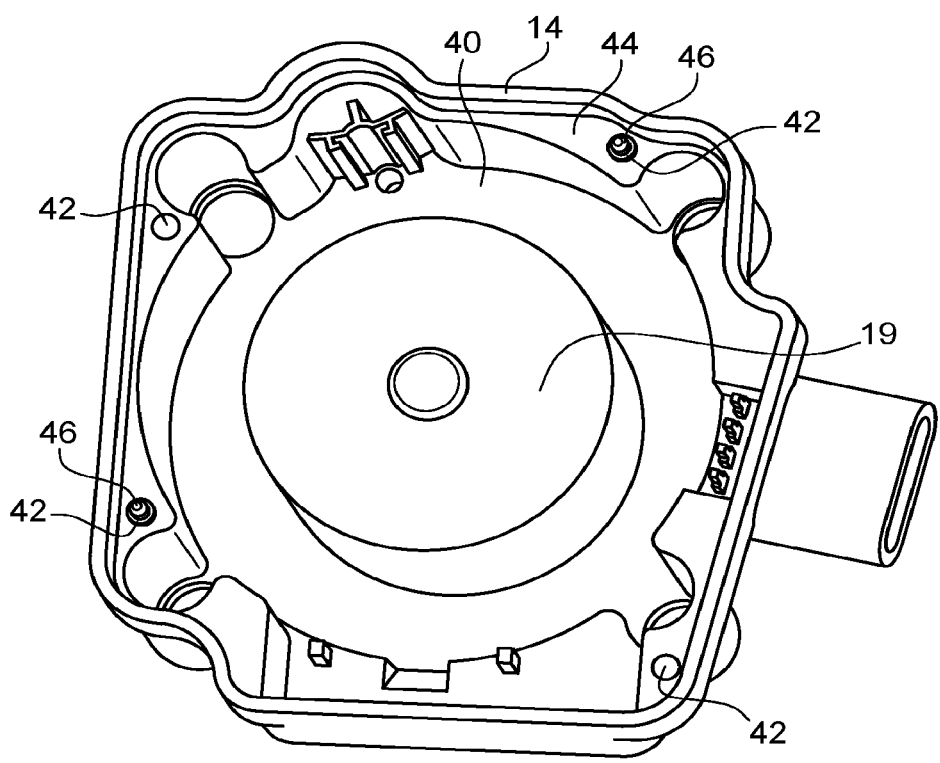
FIG. 12 shows the stator housing in a perspective view.
Figure 13:
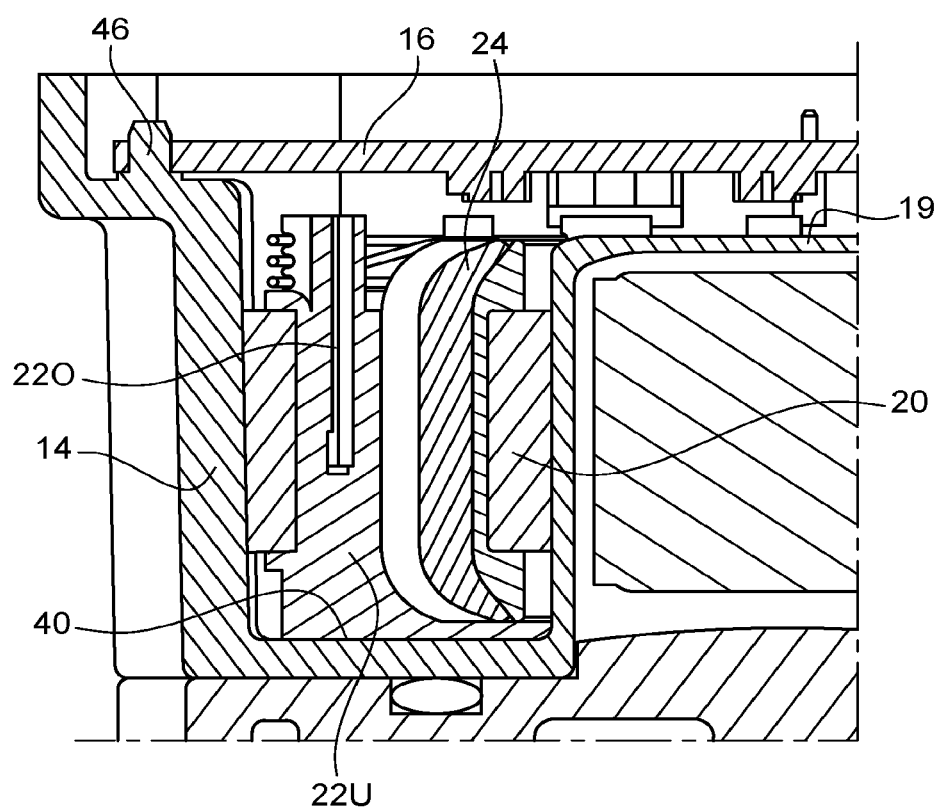
FIG. 13 shows the stator housing with the stator mounted thereon and the printed circuit board installed, in a perspective sectioned view.

In the assembled state, the lower part 22U of the stator insulation 22 rests on the base of the stator housing 14. This forms a bearing surface 40 for the stator insulation. The printed circuit board 16 is positioned by means of supporting surfaces 42, which are likewise provided in the stator housing 14. As can be seen especially in FIGS. 11, 12 and 13, the supporting surfaces 42 are formed on a shoulder 44 of the stator housing 14, with the result that the printed circuit board 16 is supported at several points along its circumference.

Some of the supporting surfaces 42 are provided with a centring pin 46, which extends through a centring opening of the printed circuit board 16.

The printed circuit board 16 is thus positioned by the same component as the contact carrier 36, namely by the stator housing 14. Since both the bearing surface 40 and the supporting surfaces 42 are formed integrally with the stator housing 14, the distance between these surfaces, as measured along the centre line of the stator, is independent of tolerances of the components of the stator. In particular, the height tolerance of the laminated stator core 20 has no effect on the position of the printed circuit board 16 relative to the terminal contacts 28.

Figure 3:
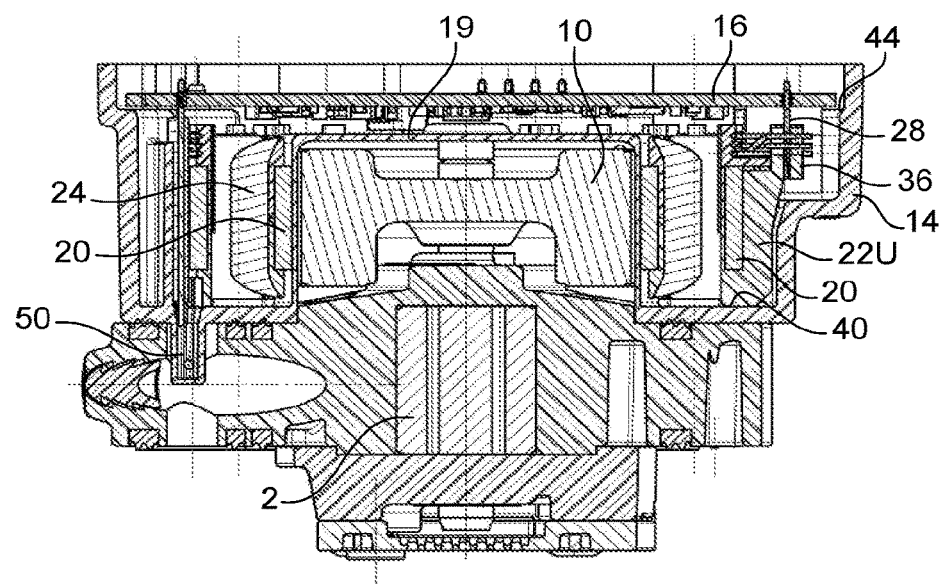
FIG. 3 shows a section along the plane III-III of FIG. 2.
Figure 4:
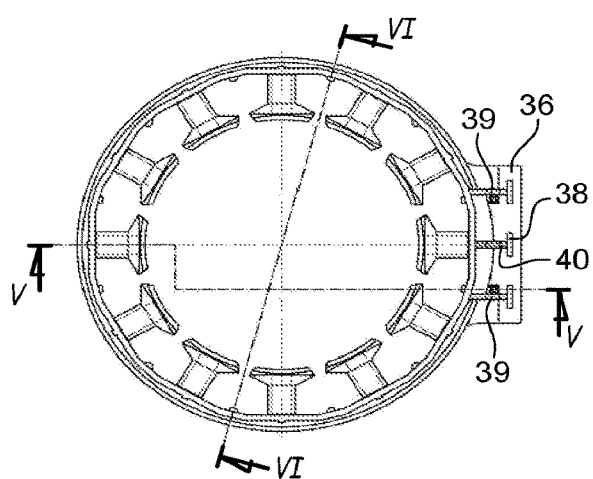
FIG. 4 shows a bottom view of the stator, wherein the stator windings have been omitted for the sake of greater clarity.

The figures also show a temperature sensor 50, which is mounted on the printed circuit board 16 and projects into a flow channel of the pump 4 when the printed circuit board 16 is mounted in the stator housing 14 (see especially FIG. 3).

The invention claimed is:

1. A drive assembly comprising:
an electric motor,
a stator housing, a stator accommodated therein and having at least one winding, and a stator insulation which has a lower part and an upper part, wherein the upper part and the lower part of the stator insulation are connected to one another by means of a latching connection, wherein the lower part rests against at least one bearing surface in the stator housing,
terminal contacts for the winding, wherein the terminal contacts are held in a contact carrier, which is provided on the lower part of the stator insulation, and
a printed circuit board, which rests on at least one supporting surface in the stator housing, wherein both the bearing surface and the supporting surface are formed integrally with the stator housing, and both the bearing surface and the supporting surface are axial abutment surfaces with respect to an insertion direction of the stator within the stator housing, and
wherein the terminal contacts are in contact with associated conductor tracks of the printed circuit board.

2. The drive assembly according to claim 1, wherein the latching connection allows play of the upper part relative to the lower part.

3. The drive assembly according to claim 1, wherein the stator housing has a base which forms the bearing surface for the lower part.

4. The drive assembly according to claim 1, wherein the stator housing has a shoulder, on which the supporting surface for the printed circuit board is arranged.

5. The drive assembly according to claim 4, wherein a plurality of supporting surfaces is arranged on the shoulder, wherein a centring pin is assigned to at least one of the supporting surfaces.

6. The drive assembly according to claim 1, wherein the upper part rests laterally against the contact carrier.

7. The drive assembly according to claim 1, wherein the terminal contacts are insulation displacement contacts and the contact carrier has guide channels for the ends of the winding.

8. The drive assembly according to claim 1, wherein the terminal contacts have a press-in pin which is pressed into a contact opening of the printed circuit board.

9. The drive assembly according to claim 1, wherein the electric motor drives an oil pump which can supply a transmission actuator or for cooling and/or lubricating a transmission.

10. The drive assembly according to claim 1, wherein the contact carrier is provided on the lower part of the stator insulation positioned on a first side of the stator core,
wherein the circuit board is located on a second side of the stator core opposite to the first side.

* * * * *